(12) United States Patent
Nozoe

(10) Patent No.: US 7,387,025 B2
(45) Date of Patent: Jun. 17, 2008

(54) ANGULAR VELOCITY SENSOR

(75) Inventor: Toshiyuki Nozoe, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/589,966

(22) PCT Filed: Feb. 14, 2005

(86) PCT No.: PCT/JP2005/002125

§ 371 (c)(1),
(2), (4) Date: Aug. 18, 2006

(87) PCT Pub. No.: WO2005/078389

PCT Pub. Date: Aug. 25, 2005

(65) Prior Publication Data

US 2007/0163345 A1 Jul. 19, 2007

(30) Foreign Application Priority Data

Feb. 18, 2004 (JP) ............................. 2004-041088

(51) Int. Cl.
*G01P 9/04* (2006.01)
(52) U.S. Cl. ..................... 73/504.16; 73/1.37
(58) Field of Classification Search ............. 73/504.16, 73/504.15, 504.12, 504.02, 504.04, 1.37, 73/1.38

See application file for complete search history.

(56) References Cited

U.S. PATENT DOCUMENTS

| 6,029,516 A | 2/2000 | Mori et al. |
| 6,282,957 B1 * | 9/2001 | Akimoto et al. ......... 73/504.12 |
| 6,792,792 B2 * | 9/2004 | Babala ....................... 73/1.38 |
| 7,107,843 B2 * | 9/2006 | Ohuchi et al. ........... 73/504.16 |

FOREIGN PATENT DOCUMENTS

| JP | 03-226620 | 10/1991 |
| JP | 03-226621 | 10/1991 |
| JP | 07-083951 | 3/1995 |
| JP | 11-101644 | 4/1999 |
| JP | 2002-139322 | 5/2002 |

\* cited by examiner

Primary Examiner—Helen C. Kwok
(74) Attorney, Agent, or Firm—McDermott Will & Emery LLP

(57) ABSTRACT

An angular velocity sensor is provided, which is capable of accurate failure diagnosis on a detecting portion despite of its simple configuration and small size without providing additional means on an oscillator separately from the driving portion and a detecting portion. When a check signal for carrying out failure diagnosis is input to terminal (54) from outside, the degree of amplification at amplifier (45) is decreased, and the degree of amplification at amplifier (44) is simultaneously increased by an operation of AGC circuit (43). As a result, a driving signal having the decreased amplitude can be obtained at terminals (50) and (53), and a driving signal having the increased amplitude can be obtained at terminals (51) and (52). The driving signals are supplied to one driving electrode and another driving electrode, respectively, of a pair of driving electrodes spaced from each other across the center of the arm of a tuning fork type oscillator through terminals (50) to (53).

8 Claims, 9 Drawing Sheets

41, 62, 63: current amplifier

42: full wave rectifier circuit

43: AGC circuit 44, 45, 46, 47: amplifier

64: differential amplifier

65: phase device

66: synchronous wave detector

67: low-pass filter

ANGULAR VELOCITY SENSOR

RELATED APPLICATION

This application is a national phase of PCT/JP2005/002125 filed on Feb. 14, 2005 which claims priority from Japanese Application No. 2004-041088 filed on Feb. 18, 2004, the disclosures of which Applications are incorporated by reference herein. The benefit of the filing and priority dates of the International and Japanese Applications is respectfully requested.

TECHNICAL FIELD

The present invention relates to an angular velocity sensor having a failure diagnosis function.

BACKGROUND ART

For example, an angular velocity sensor of this type has been disclosed in Japanese Patent Unexamined Publication No. 11-101644.

FIGS. 9 and 10 show the conventional angular velocity sensor disclosed in Japanese Patent Unexamined Publication No. 11-101644. FIG. 9 is a perspective view of an oscillator of the angular velocity sensor, and FIG. 10 is a side view of the same.

Referring to FIGS. 9 and 10, piezoelectric bodies 102, 103, and 104 having electrodes formed on both sides thereof are formed on oscillating body 101 in the form of an equilateral triangular pole made of elinvar or the like, the piezoelectric bodies serving as driving portions for driving bending oscillation. Piezoelectric bodies 105 and 106 having electrodes formed on both sides thereof are provided on the side of oscillating body 101 which is opposite to piezoelectric bodies 103 and 104 with reference to the center of the oscillating body in the longitudinal direction thereof, the piezoelectric bodies serving as detecting portions for detecting a change in bending oscillation when an angular velocity Ω is applied about the longitudinal axis of oscillating body 101. Piezoelectric bodies 105 and 106 are formed with the electrodes on both sides thereof as pseudo Coriolis force generating portions for causing bending oscillation of oscillating body 101 in the same direction as a Coriolis force which acts when the angular velocity Ω is applied about the longitudinal axis of oscillating body 101.

In the conventional angular velocity sensor, there has been a need for providing special piezoelectric bodies 105 and 106 on oscillating body 101 for the diagnosis of any failure of the detecting potions separately from piezoelectric body 102 as a driving portion and piezoelectric bodies 103 and 104 as detecting portions.

DISCLOSURE OF THE INVENTION

The invention provides an angular velocity sensor capable of accurate failure diagnosis on a detecting portion in spite of the fact that it is simple and small-sized without providing additional means on an oscillator separately from a driving portion and the detecting portion for the failure diagnosis on the detecting portion.

An angular velocity sensor according to the invention includes an oscillator, a driving portion provided on the oscillator and capable of driving the same in an X-axis direction and a Z-axis direction thereof, and a first driving circuit for supplying a driving signal for driving the oscillator in the X-axis direction thereof to the driving portion. The sensor also includes a second driving circuit for supplying a driving signal for driving the oscillator in the X-axis direction and the Z-axis direction to the driving portion. The sensor also includes a detecting portion provided on the oscillator for detecting deflection oscillating in the Z-axis direction thereof and an angular velocity detection circuit for outputting an angular velocity signal by amplifying and detecting a signal output from the detecting portion when the driving signal is supplied from the first driving circuit to the driving portion and an angular velocity is applied about a Y-axis of the oscillator. The sensor also includes a self diagnosis circuit for outputting a signal to enable failure diagnosis on the detecting portion by amplifying and detecting a signal output from the detecting portion when the driving signal is supplied from the second driving circuit to the driving portion.

Since there is no need for providing additional means on the oscillator to allow failure diagnosis on the detecting portion separately from the driving portion and the detecting portion in such a configuration, failure diagnosis on the detecting portion can be accurately carried out despite of the simple and compact configuration.

In an angular velocity sensor according to the invention, the oscillator includes a tuning fork type oscillator made of an elastic material having at least two arms and at least one base portion connecting the arms. The driving portion includes a piezoelectric film on which at least top electrodes are spaced from each other across a boundary constituted by the center of at least one principal surface of at least one of the arms of the tuning fork type oscillator. Further, the detecting portion includes a piezoelectric film provided on at least one principal surface of at least one of the arms of the tuning fork type oscillator and having electrodes on both sides thereof. The sensor is configured such that driving signals which are inverted from each other in phase are supplied from the first driving circuit to top electrodes spaced from each other to cause tuning fork oscillation of the tuning fork type oscillator in the X-axis direction of the tuning fork type oscillator and such that predetermined driving signals which are inverted from each other in phase and different from each other in amplitude are supplied from the second driving circuit to the respective top electrodes spaced from each other to cause tuning fork oscillation in the X-axis direction of the tuning fork type oscillator and to cause oscillation also in the Z-axis direction thereof.

In such a configuration, when a driving signal is supplied from the first driving circuit to the top electrodes spaced from each other across the center of the arm of the tuning fork type oscillator, balance is achieved to cancel forces which otherwise deflect left and right parts of the arm bounded by the center of the arm opposite to each other in the Z-axis direction of the tuning fork type oscillator. Therefore, tuning fork oscillation occurs only in the X-axis direction of the tuning fork type oscillator. However, the driving signals inverted from each other in phase and different from each other in amplitude are supplied from the second driving circuit to the top electrodes spaced from each other across the center of the arm of the tuning type oscillator. At this time, imbalance occurs between the forces acting to deflect the left and right parts of the arm bounded by the center of the arm opposite to each other in the Z-axis direction of the tuning fork type oscillator. Since those forces are therefore not cancelled by each other, the tuning fork oscillation in the X-axis direction of the tuning fork type oscillator is accompanied by simultaneous flexural oscillation in the Z-axis direction which occurs as if there was a Coriolis force as a result of the application of an angular velocity. The deflection of the tuning fork oscillator in the Z-axis direction induces electric charges on the electrodes on the piezoelectric film serving as the detecting portion provided independently of the driving portion.

The signal can be amplified and detected by the self diagnosis circuit to output a signal which allows failure diagnosis to be carried out without using the detecting portion, which is not combined with the driving portion, the two made independent of each other.

In an angular velocity sensor according to the invention, the oscillator includes two arms and a base portion connecting the arms, and the base portion is made of an elastic material. The sensor also includes at least a tuning fork type oscillator. Driving portions are spaced from each other across a boundary constituted by the center of at least one principal surface of at least one of the arms of the tuning fork type oscillator. The tuning fork type oscillator includes a pair of piezoelectric films having an electrode on each of the top and bottom thereof.

Further, the detecting portion includes a piezoelectric film which is provided on at least one principal surface of at least one of the arms of the tuning fork type oscillator and which has electrodes on both sides thereof. The sensor is configured such that driving signals which are inverted from each other in phase are supplied from the first driving circuit to the top electrodes spaced from each other to cause tuning fork oscillation in the X-axis direction of the tuning fork type oscillator and such that driving signals which are inverted from each other in phase and different in amplitude are supplied from the second driving circuit to the top electrodes spaced from each other to cause tuning fork oscillation in the X-axis direction and oscillation also in the Z-axis direction.

When the driving signals from the first driving circuit are supplied to the top electrodes of the pair of piezoelectric films spaced from each other across the center of the arm of the tuning fork type oscillator, balance is achieved to cancel forces which otherwise deflect left and right parts of the arm bounded by the center of the arm opposite to each other in the Z-axis direction of the tuning fork type oscillator. Therefore, tuning fork oscillation occurs only in the X-axis direction. However, the driving signals inverted from each other in phase and different from each other in amplitude are supplied from the second driving circuit to the top electrodes of the pair of piezoelectric films spaced from each other across the center of the arm of the tuning type oscillator. Thus, imbalance occurs between the forces acting to deflect the left and right parts of the arm bounded by the center of the arm opposite to each other in the Z-axis direction of the tuning fork type oscillator. Since those forces are not cancelled by each other consequently, the tuning fork oscillation in the X-axis direction is accompanied by simultaneous flexural oscillation in the Z-axis direction which occurs as if there was a Coriolis force as a result of the application of an angular velocity.

The deflection in the Z-axis direction induces electric charges on the electrodes on the piezoelectric films serving as detecting portions provided independently of the driving portions. The signals can be amplified and detected by the self diagnosis circuit to output a signal which allows failure diagnosis to be carried out without using the detecting portions in combination with the driving portions such that they are independent of each other. Since the driving portions are provided apart from each other across the center of the arm of the tuning fork type oscillator, oscillation can be generated accurately in the X-axis direction and the Z-axis direction.

In an angular velocity sensor according to the invention, the oscillator includes a tuning fork type oscillator made of an elastic material and having at least two arms and at least one base portion connecting the arms. The driving portion includes first and second piezoelectric films which are provided on the two arms of the tuning fork type oscillator and on which at least upper electrodes are spaced from each other across the center of one principal surface of each arm, a difference being provided at least between the surface areas of the upper electrodes on the respective arms.

Further, the detecting portion includes a piezoelectric film provided on at least one principal surface of at least one of the arms of the tuning fork type oscillator and having an electrode on both sides thereof. Driving signals which are inverted from each other in phase are supplied from the first driving circuit to the upper electrodes provided on the first and second piezoelectric films, respectively, and spaced from each other to cause tuning fork oscillation in the X-axis direction of the tuning fork type oscillator.

Driving signals which are inverted from each other in phase and different in amplitude are supplied from the second driving circuit to the upper electrodes spaced from each other on the first and second piezoelectric films to cause tuning fork oscillation in the X-axis direction and oscillation also in the Z-axis direction.

In such a configuration, when the driving signals are supplied from the first driving circuit to the upper electrodes spaced from each other across the centers of the arms of the tuning fork type oscillator, balance is achieved to cancel forces which otherwise deflect left and right parts of the arms bounded by the centers of the arms opposite to each other in the Z-axis direction of the tuning fork type oscillator. Therefore, tuning fork oscillation occurs only in the X-axis direction of the tuning fork type oscillator. However, the driving signals inverted from each other in phase and different from each other in amplitude are supplied from the second driving circuit to the top electrodes spaced from each other across the centers of the arms of the tuning type oscillator.

As a result, imbalance occurs between the forces acting to deflect the left and right parts of the arms bounded by the centers of the arms opposite to each other in the Z-axis direction. Further, the degree of imbalance is different between the arms because the surface area of the top electrodes on one arm is different from that on the other arm. As a result, tuning fork oscillation occurs in the X-axis direction, and flexural oscillation in the Z-axis direction simultaneously occurs as if there was a Coriolis force as a result of the application of an angular velocity. The deflection in the Z-axis direction induces electric charges on the electrodes on the piezoelectric films serving as the detecting portions provided independently of the driving portions.

The induced signal can be amplified and detected by the self diagnosis circuit to output a signal which allows failure diagnosis to be carried out without using the detecting portions and the driving portions in combination such that they are independent of each other.

In an angular velocity sensor according to the invention, the oscillator includes a tuning fork type oscillator made of an elastic material and having at least two arms and at least one base portion connecting the arms. The driving portion includes a pair of piezoelectric films which are provided on the two arms of the tuning fork type oscillator and spaced from each other across the center of one principal surface of each arm and which have an electrode on each of the top and bottom thereof, a difference being provided at least between the surface areas of the top electrodes on the respective arms.

Further, the detecting portion includes a piezoelectric film provided on at least one principal surface of at least one of the arms of the tuning fork type oscillator and having an electrode on both sides thereof. Driving signals which are inverted from each other in phase are supplied from the first driving circuit to the top electrodes provided on the respective pairs of piezoelectric films and spaced from each other to cause tuning fork oscillation in the X-axis direction of the tuning fork type oscillator.

Driving signals which are inverted from each other in phase and different in amplitude are supplied from the second driving circuit to the top electrodes provided on the respective pairs of piezoelectric films and spaced from each other to cause tuning fork oscillation in the X-axis direction and oscillation also in the Z-axis direction, of the tuning fork type oscillator.

In such a configuration, when the driving signals are supplied from the first driving circuit to the upper electrodes spaced from each other across the centers of the arms of the tuning fork type oscillator, balance is achieved to cancel forces which otherwise deflect left and right parts of the arms bounded by the centers of the arms opposite to each other in the Z-axis direction. Therefore, tuning fork oscillation occurs only in the X-axis direction of the tuning fork type oscillator.

However, the driving signals inverted from each other in phase and different from each other in amplitude are supplied from the second driving circuit to the top electrodes spaced from each other across the centers of the arms of the tuning type oscillator. As a result, imbalance occurs between the forces acting to deflect the left and right parts of the arms bounded by the centers of the arms opposite to each other in the Z-axis direction of the tuning fork type oscillator. Further, the degree of imbalance is different between the arms because the surface area of the top electrodes on one arm is different from that on the other arm.

As a result, tuning fork oscillation in the X-axis direction of the tuning fork type oscillator is accompanied by simultaneous flexural oscillation in the Z-axis direction which occurs as if there was a Coriolis force as a result of the application of an angular velocity. The deflection in the Z-axis direction of the tuning fork type oscillator induces electric charges on the electrodes on the piezoelectric films serving as the detecting portions provided independently of the driving portions.

The induced signals (electric charges) can be amplified and detected by the self diagnosis circuit to output a signal which allows failure diagnosis to be carried out without using the detecting portions and the driving portions in combination such that they are independent of each other. Since the driving portions are provided apart from each other across the centers of the arms of the tuning fork type oscillator, oscillations can be more accurately generated in the X-axis direction and the Z-axis direction of the tuning fork type oscillator.

In an angular velocity sensor according to the invention, the oscillator includes a tuning fork type oscillator made of an elastic material and having at least two arms and at least one base portion connecting the arms. The driving portion includes first and second piezoelectric films which are provided on the two arms of the tuning fork type oscillator and on which at least upper electrodes are spaced from each other across the center of one principal surface of each arm, a difference being provided at least between the positions in the Y-axis direction of the upper electrodes on the respective arms.

The detecting portion includes a piezoelectric film provided on at least one principal surface of at least one of the arms of the tuning fork type oscillator and having an electrode on both sides thereof. Driving signals which are inverted from each other in phase are supplied from the first driving circuit to the upper electrodes spaced from each other on the first and second piezoelectric films, respectively, to cause tuning fork oscillation in the X-axis direction of the tuning fork type oscillator. Driving signals which are inverted from each other in phase and different in amplitude are supplied from the second driving circuit to the upper electrodes spaced from each other on the first and second piezoelectric films, respectively, to cause tuning fork oscillation in the X-axis direction in the tuning fork type oscillator and oscillation also in the Z-axis direction.

When the driving signals from the first driving circuit are supplied to the top electrodes spaced from each other across the centers of the arms of the tuning fork type oscillator, balance is achieved to cancel forces which otherwise defect left and right parts of the arms bounded by the centers of the arms opposite to each other in the Z-axis direction. Therefore, tuning fork oscillation occurs only in the X-axis direction.

However, when the driving signals inverted from each other in phase and different from each other in amplitude are supplied from the second driving circuit to the top electrodes spaced from each other across the centers of the arms of the tuning type oscillator, imbalance occurs between the forces acting to deflect the left and right parts of the arm bounded by the centers of the arms opposite to each other in the Z-axis direction.

Since the degree of imbalance is different between the arms because the position of the upper electrodes on one arm in the Y-axis direction is different from that on the other arm. Thus, at the same time when tuning fork oscillation occurs in the X-axis direction of the tuning fork type oscillator, flexural oscillation in the Z-axis direction can be generated as if there was a Coriolis force as a result of the application of an angular velocity. The effect of the flexural oscillation in the Z-axis direction induces electric charges on the electrodes on the piezoelectric films serving as detecting portions provided independently of the driving portions.

The induced electric charges (signals) can be amplified and detected by the self diagnosis circuit to output a signal which allows failure diagnosis to be carried out without using the detecting portions in combination with the driving portions such that they are independent of each other.

In an angular velocity sensor according to the invention, the oscillator is a tuning fork type oscillator made of an elastic material and having at least two arms and at least one base portion connecting the arms.

Driving portions are provided on the two arms of the tuning fork type oscillator and are spaced from each other across a boundary constituted by the center of one principal surface of each arm. An electrode is provided on each of the top and bottom of piezoelectric films which are a major feature of the tuning fork type oscillator. The piezoelectric films are a pair of piezoelectric films whose top electrodes are located in different positions at least in the Y-direction of the respective arms.

The detecting portion includes a piezoelectric film provided on at least one principal surface of at least one of the arms of the tuning fork type oscillator and having an electrode on both sides thereof. Driving signals which are inverted from each other in phase are supplied from the first driving circuit to the top electrodes spaced from each other on the respective pairs of piezoelectric films to cause tuning fork oscillation in the X-axis direction. Driving signals which are inverted from each other in phase and different in amplitude are supplied from the second driving circuit to the top electrodes spaced from each other on the respective pairs of piezoelectric films to cause tuning fork oscillation in the X-axis direction and oscillation also in the Z-axis direction, of the tuning fork type oscillator.

In such a configuration, when the driving signals are supplied from the first driving circuit to the top electrodes spaced from each other across the centers of the arms of the tuning fork type oscillator, balance is achieved to cancel forces which otherwise deflect left and right parts of the arms bounded by the centers of the arms opposite to each other in the Z-axis direction. Therefore, tuning fork oscillation occurs only in the X-axis direction. However, when the driving signals inverted from each other in phase and different from each other in amplitude are supplied from the second driving circuit to the top electrodes spaced from each other across the centers of the arms of the tuning type oscillator, imbalance occurs between the forces acting to deflect the left and right parts of the arms bounded by the centers of the arms opposite to each other in the Z-axis direction. Further, the degree of imbalance is different between the arms because the position of the top electrodes on one arm in the Y-axis direction is different from that on the other arm. As a result, tuning fork oscillation occurs in the X-axis direction, and flexural oscillation in the Z-axis direction simultaneously occurs as if there was a Coriolis force as a result of the application of an angular velocity.

The deflection in the Z-axis direction induces electric charges on the electrodes on the piezoelectric films serving as detecting portions provided independently of the driving portions. The signals can be amplified and detected by the self diagnosis circuit to output a signal which allows failure diagnosis to be carried out without using the detecting portions and the driving portions in combination such that they are independent of each other. Since the driving portions are provided apart from each other across the centers of the arms of the tuning fork type oscillator, there is an advantage in that oscillation can be more accurately generated in the X-axis direction and the Z-axis direction.

In angular velocity sensor according to the invention, the angular velocity detection circuit and the self diagnosis circuit are combined to serve a double purpose. Since a simpler circuit configuration can therefore be provided, reductions can be achieved in size and cost.

An angular velocity sensor according to the invention includes a failure diagnosis check terminal to which a check signal is input from outside to carry out the failure diagnosis. The angular velocity sensor also includes means for generating a difference in amplitude between the driving signals according to an output signal from the check terminal, provided in the second driving circuit. In such a configuration, since an external check signal can be accepted by the angular velocity sensor of the invention as occasion arises, failure diagnosis can be carried out at any time.

DESCRIPTION OF REFERENCE NUMERALS AND SIGNS

Figure 1:
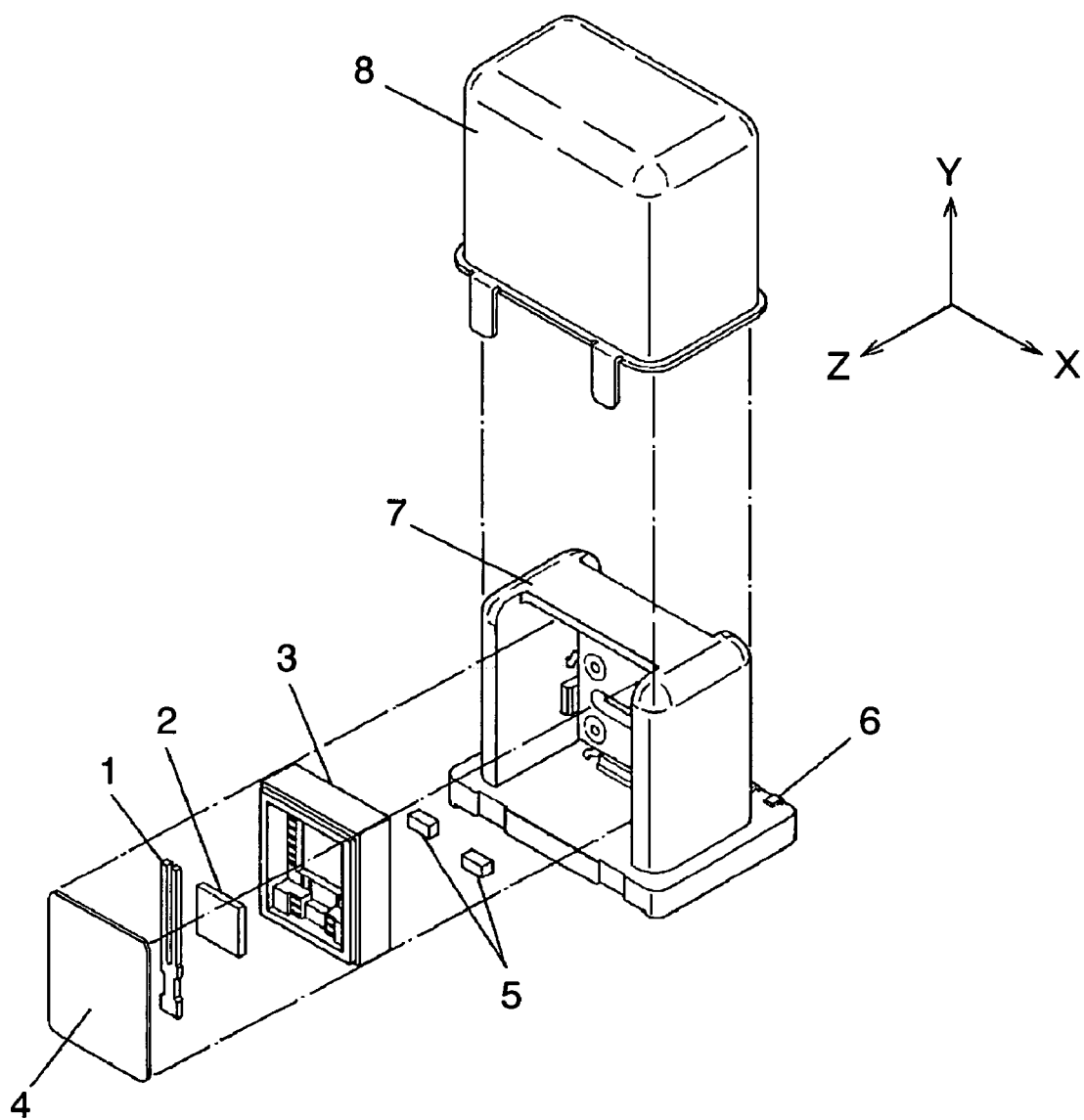
FIG. 1 is an exploded perspective view of an angular velocity sensor according to Embodiment 1 of the invention.

1: tuning fork type oscillator
2: IC chip
3: package
4: lid
5: chip component
6: terminal
7: holder
8: case
10a, 10b: arm
11a, 12a, 13a, 14a, 15a, 16a: top electrode
11b, 12b, 13b, 14b: piezoelectric film
11c, 12c, 13c, 14c: bottom electrode
17: monitoring electrode
18: support portion
19, 20, 21, 22, 23, 74, 75: pad electrode
30: center of arm 10a
31: center of arm 10b
32, 33: principal surface
40, 50, 51, 52, 53, 54, 60, 61, 68: terminal
41, 62, 63: current amplifier
42: full wave rectifier circuit
43: AGC circuit
44, 45, 46, 47: amplifier
64: differential amplifier
65: phase device
66: synchronous wave detector
67: low-pass filter
70a, 71a, 72a, 73a: top electrode
76, 86: rotating direction of arm 10a
77, 87: rotating direction of arm 10b
80a, 81a, 82a, 83a: top electrode

BEST MODE FOR CARRYING OUT THE INVENTION

A mode for carrying out the invention will now be described with reference to the drawings.

Embodiment 1

Figure 2:
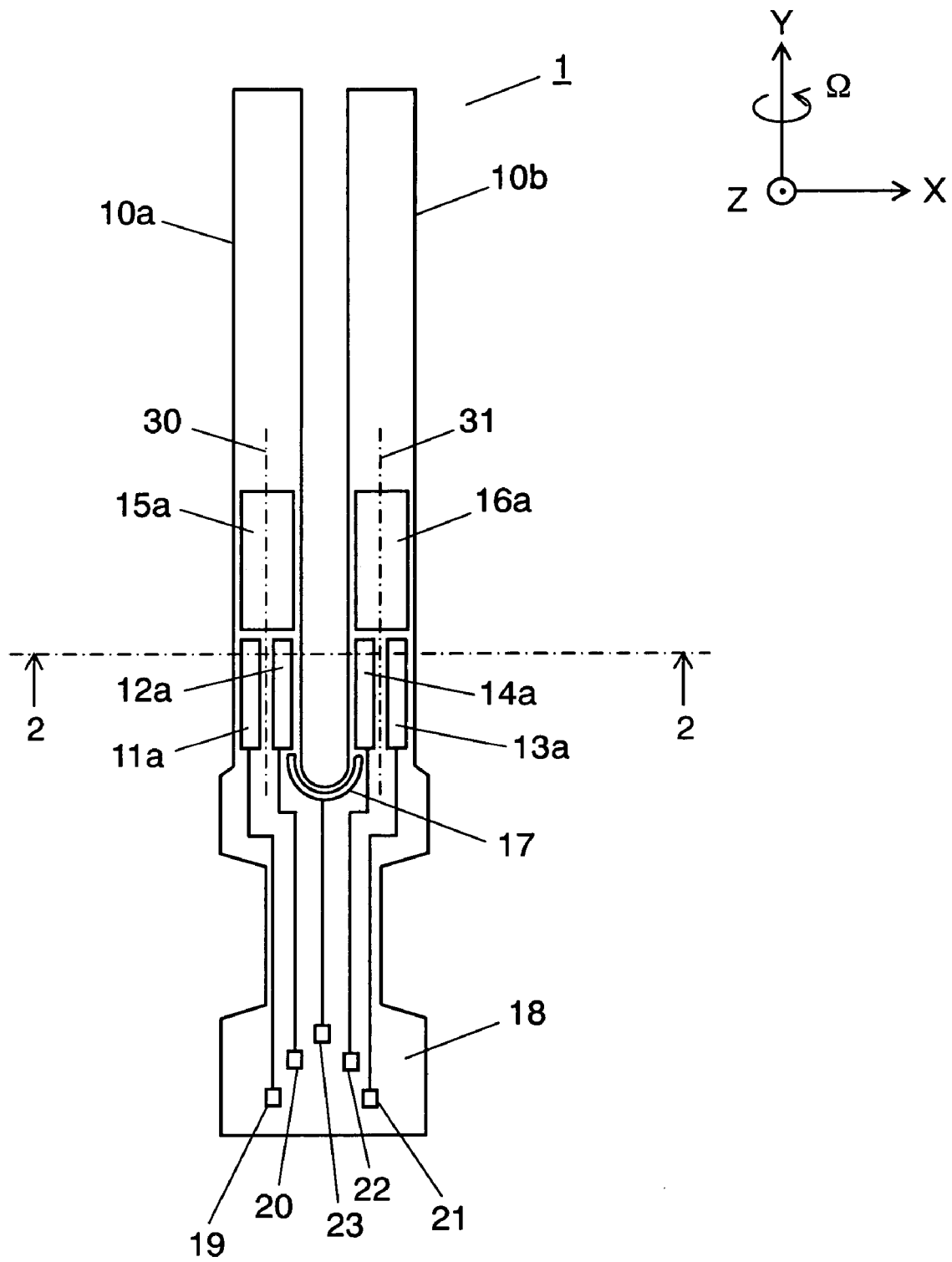
FIG. 2 is a configuration diagram of a tuning fork type oscillator used in the angular velocity sensor.
Figure 3:
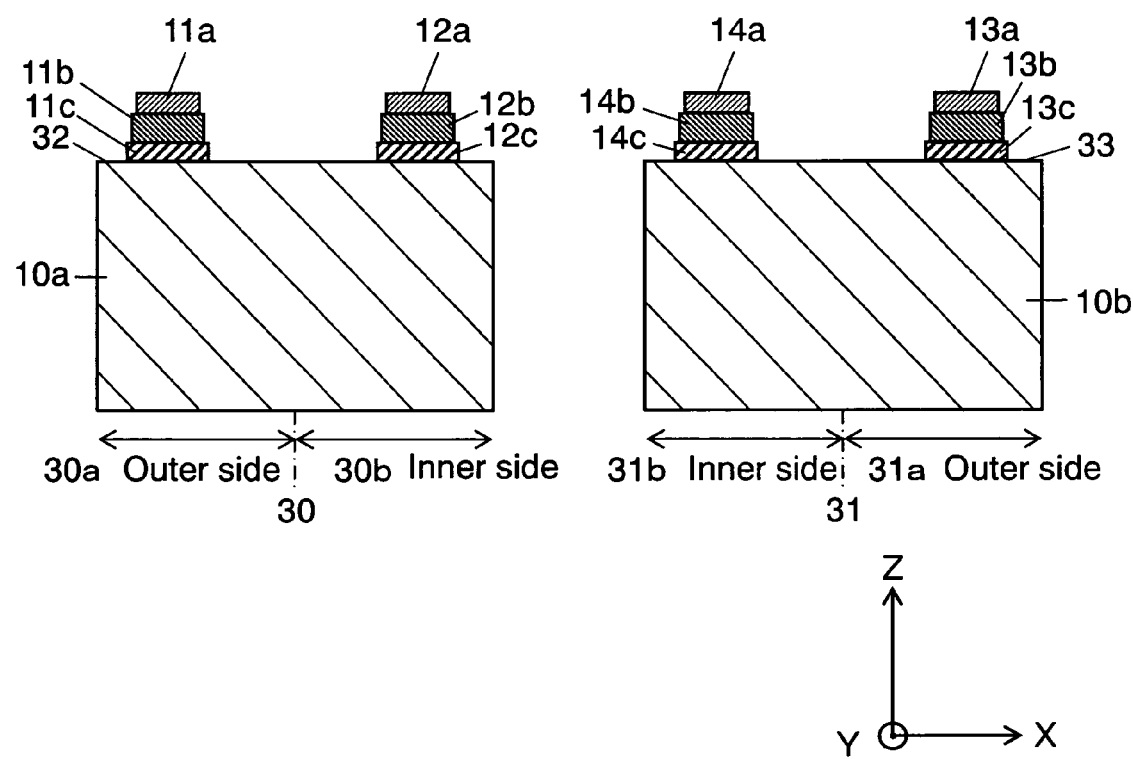
FIG. 3 is a sectional view of the tuning fork type oscillator shown in FIG. 2 taken along the line 2-2.
Figure 4:
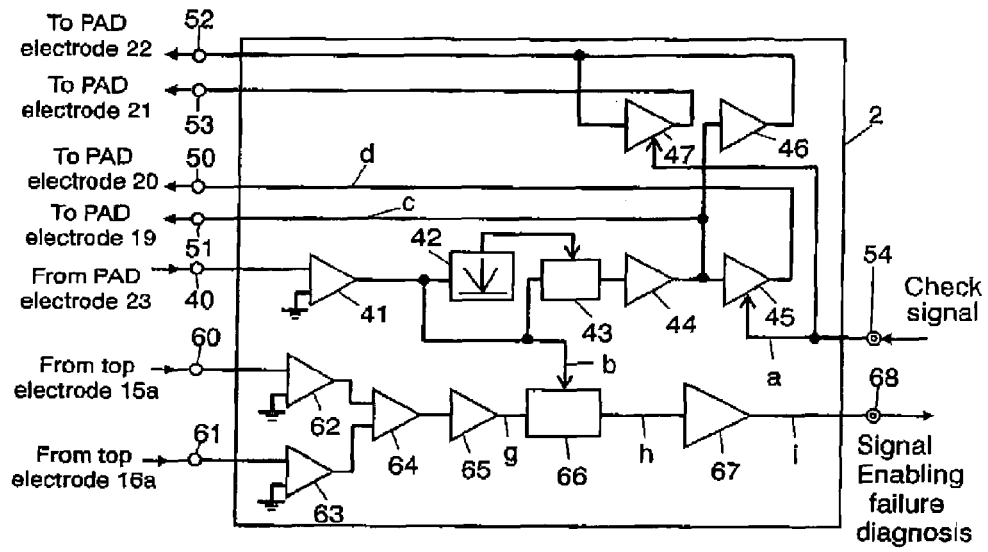
FIG. 4 is a circuit block diagram of the angular velocity sensor according to the invention.
Figure 5:
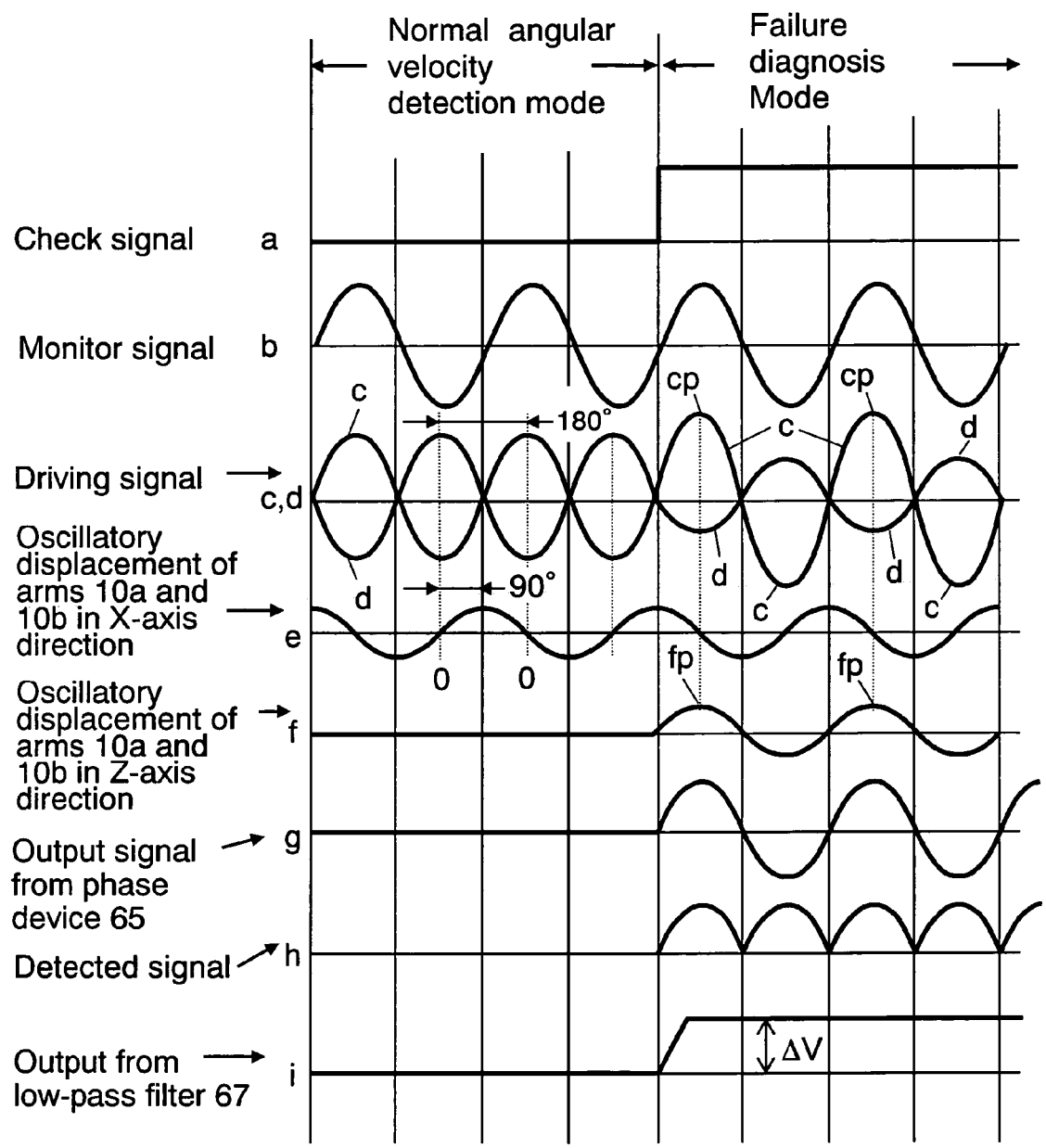
FIG. 5 is a signal waveform diagram showing major parts of the circuit of the angular velocity sensor shown in FIG. 4 according to the invention and states of oscillation at arms of the oscillator.
Figure 6:
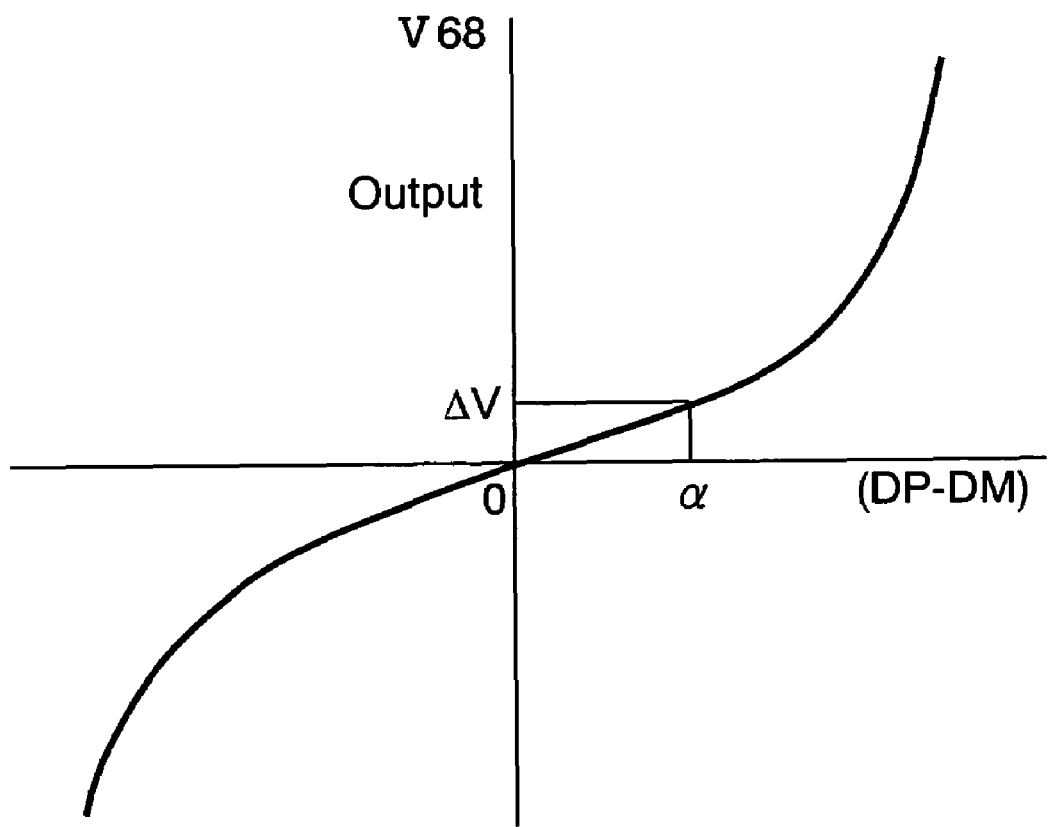
FIG. 6 is a characteristic diagram representing a relationship between driving signal amplitude differences during failure diagnosis and an output signal from a self diagnosis circuit.

FIG. 1 is an exploded perspective view of an angular velocity sensor according to Embodiment 1 of the invention. FIG. 2 is a configuration diagram of a tuning fork type oscillator used in the angular velocity sensor. FIG. 3 is a sectional view of the tuning fork type oscillator shown in FIG. 2 taken along the line 2-2. FIG. 4 is a circuit block diagram of the angular velocity sensor. FIG. 5 is a signal waveform diagram showing major parts in the block diagram and states of oscillation of arms of the oscillator. FIG. 6 is a characteristic diagram representing a relationship between driving signal amplitude differences during failure diagnosis and an output signal from a self diagnosis circuit.

The angular velocity sensor shown in FIG. 1 includes tuning fork type oscillator 1 whose base portion or base member is formed from an elastic material such as silicon, IC chip 2 incorporating a circuit, package 3 made of ceramic containing tuning fork type oscillator 1 and IC chip 2, lid 4 for sealing package 3, holder 7 molded of resin integrally with package 3 sealed by lid 4, chip components 5, and conductors such as terminal 6, and case 8 covering holder 7.

FIG. 2 shows a configuration of the tuning fork type oscillator used in the angular velocity sensor. Tuning fork type oscillator 1 includes arms 10a and 10b. It also includes top electrodes 11a, 12a, 13a, and 14a which are driving electrodes provided on piezoelectric films 11b, 12b, 13b, and 14b shown in FIG. 3 to be described later, respectively. Top electrodes 15a and 16a constitute a detecting portion.

Monitor electrode 17 monitors the amplitude of arms 10a and 10b during tuning fork oscillation of tuning fork type oscillator 1 in an X-axis direction. Support portion 18 supports tuning fork type oscillator 1. Electrodes 19, 20, 21, 22, and 23 are pad electrodes connected to top electrodes 11a, 12a, 13a, and 14a and to monitor electrode 17, respectively. Center 30 and center 31 represent the centers of arm 10a and arm 10b, respectively.

FIG. 3 is a sectional view of tuning fork type oscillator 1 shown in FIG. 2 taken along the line 2-2. Parts identical to those shown in FIG. 2 are given like reference numerals. Arm 10a has outer side 30a and inner side 30b which are bounded by center 30. Arm 10a also has one principal surface 32. Bottom electrode 11c is provided on principal surface 32 on outer side 30a of arm 10a. Piezoelectric film 11b obtained by polarizing a film made of PZT in the vertical direction is provided on bottom electrode 11c, and top electrode 11a serving as a driving electrode is provided on the same.

Similarly, bottom electrode 12c, polarized piezoelectric film 12b, and top electrode 12a are provided in the order listed on principal surface 32 on inner side 30b of arm 10a.

Referring to FIG. 3 further, arm 10b has outer side 31a and inner side 31b which are bounded by center 31. Arm 10b also has one principal surface 33. Bottom electrode 13c is provided on principal surface 33 of outer side 31a of arm 10b. Piezoelectric film 13b obtained by polarizing a film made of PZT in the vertical direction is provided on bottom electrode 13c, and top electrode 13a serving as a driving electrode is provided on the same.

Similarly, bottom electrode 14c, polarized piezoelectric film 14b, and top electrode 14a are provided in the order listed on principal surface 33 on inner side 31b of arm 10b.

The driving portion has what we call paired configuration, constituted by a part formed by top electrode 11a, piezoelectric film 11b, and bottom electrode 11c and a part formed by top electrode 12a, piezoelectric film 12b, and bottom electrode 12c provided on arm 10a as described above.

Similarly, a pair of driving portions is also formed on arm 10b. The driving portions are formed substantially symmetrically about center 30 of arm 10a, and they are also formed such that they are substantially symmetric between left and right arms 10a and 10b about the axis of symmetry of tuning fork type oscillator 1.

A detecting portion is constituted by a bottom electrode (not shown) provided on principal surface 32 of arm 10a, a piezoelectric film (not shown) obtained by polarizing a film made of PZT in the vertical direction and provided on the bottom electrode, and top electrode 15a provided on the piezoelectric film. Similarly, a detecting portion is constituted by a bottom electrode (not shown) on principal surface 33 of arm 10b, a piezoelectric film (not shown) obtained by polarizing a film made of PZT in the vertical direction and provided on the bottom electrode, and top electrode 16a provided on the piezoelectric film.

The detecting portions are also formed such that they are substantially symmetric between left and right arms 10a and 10b about the axis of symmetry of tuning fork type oscillator 1.

Similarly, a piezoelectric film (not shown) obtained by polarizing a film made of PZT in the vertical direction and a bottom electrode (not shown) are also provided under monitoring electrode 17.

FIG. 4 is a block diagram of a circuit used in the angular velocity sensor according to the invention. An electric charge generated at monitoring electrode 17 is supplied through pad electrode 23 to terminal 40 shown in the middle of the left side when FIG. 4 is viewed from this side. Current amplifier 41 amplifies the charge input to terminal 40, and output from the same is input to full wave rectifier 42 to be rectified and smoothed. Output from current amplifier 41 and output from full wave rectifier 42 are input to AGC circuit 43. AGC circuit 43 controls the amplitude of a driving signal such that the amplitude of tuning fork oscillation of arms 10a and 10b in the X-axis direction of tuning fork type oscillator 1 becomes a predetermined value. Output from AGC circuit 43 is input to amplifier 44, and output from the same is supplied through terminal 51 and pad electrode 19 shown in FIG. 2 to top electrode 11a, for example, as a positive driving signal.

The output from amplifier 44 is also input to amplifier 45. Output from amplifier 45 is supplied through terminal 50 and pad electrode 20 shown in FIG. 2 to top electrode 12a. Referring to the output from amplifier 45, for example, a negative driving signal which is substantially the same as amplifier 44 in amplitude and inverted or shifted 180 deg from the same in phase is supplied.

The output from amplifier 44 is also input to amplifier 46. Output from amplifier 46 is supplied through terminal 52 and pad electrode 22 shown in FIG. 2 to top electrode 14a. Referring to the output from amplifier 46, for example, a negative driving signal which is substantially the same as amplifier 44 in amplitude and inverted or shifted 180 deg from the same in phase is supplied to top electrode 14a.

The output from the amplifier 46 is input to amplifier 47. Referring to output from amplifier 47, for example, the amplifier outputs a positive driving signal which is substantially equal to the output from amplifier 46 in amplitude although inverted from the same in phase. The driving signal output from amplifier 47 is supplied to top electrode 13a through terminal 53 and pad electrode 21 shown in FIG. 2.

Terminals 60 and 61 shown in a lower part of the left side of FIG. 4 in a view of the same from this side are connected to top electrodes 15a and 16a shown in FIG. 2, respectively. An electric charge generated at top electrode 15a is supplied through terminal 60 to current amplifier 62 to be amplified to a predetermined magnitude. An electric charge generated at top electrode 16a is supplied through terminal 61 to current amplifier 63 to be amplified to a predetermined magnitude. Differential amplifier 64 amplifies a differential signal generated at the outputs of current amplifiers 62 and 63. Phase device 65 is what is called phase means which shifts the phase of an output signal from differential amplifier 64 by a predetermined amount. An output signal from phase device 65 is represented by waveform g in FIG. 5 which will be described later.

The output from phase device 65 is input to synchronous wave detector 66. Synchronous wave detector 66 performs synchronous wave detection on the output (waveform g in FIG. 5) from phase device 65 using an output signal (waveform b in FIG. 5) from current amplifier 41. The signal obtained after the synchronous wave detection is represented by waveform h in FIG. 5.

The signal after the synchronous wave detection represented by waveform h in FIG. 5 is filtered by low-pass filter 67, and the filtered signal is represented by waveform i in FIG. 5. The filtered signal (waveform i in FIG. 5) is led to terminal 68.

A control signal for changing the degrees of amplification at amplifier 45 and amplifier 47 is input to terminal 54 (failure diagnosis check terminal) shown in the middle of the right side when FIG. 4 is viewed from this side. The control signal serves as an external check signal for carrying out failure diagnosis. For example, the external check signal may be a rectangular signal as represented by waveform a in FIG. 5.

A description will now be made on operations of the angular velocity sensor according to Embodiment 1 performed to conduct normal angular velocity detection.

In "normal angular velocity detection mode" shown in FIG. 5, the check signal (waveform a in FIG. 5) for carrying out failure diagnosis is not supplied from outside. Thus, the control signal for changing the degrees of amplification at amplifiers 45 and 47 is not supplied. Therefore, all of the driving signals supplied to top electrodes 11a, 12a, 13a, and 14a (see FIG. 2 and FIG. 3) have the same amplitude.

The phases of the positive (or negative) driving signal supplied to top electrode 11a and the negative (or positive) driving signal supplied to top electrode 12a are inverted from each other. Specifically, the signals are chosen such that they are at a phase difference of 180 deg from each other. Further, the positive (or negative) driving signal supplied to top electrode 13a and the negative (or positive) driving signal supplied to top electrode 14a are also chosen such that they are inverted from each other or at a 180 deg difference from each other in phase.

For example, when piezoelectric film 11b contracts in the Y-axis direction within the boundary constituted by center 30 of arm 10a under the conditions thus set, a force acting to bend arm 10a in the X-axis direction (outwardly) is generated, and a force acting to bend the arm in the Z-axis direction (the direction from the other side to this side) is simultaneously generated.

Since piezoelectric film 12b expands in the Y-axis direction within the boundary constituted by center 30 of arm 10a, a force acting to bend arm 10a in the X-axis direction (outwardly) is generated, and a force acting to bend the arm in the Z-axis direction (the direction from the other side to this side) is simultaneously generated.

As a result, balance is achieved to cancel the forces which otherwise deflect the left and right parts of arm 10a bounded by center 30 of arm 10a opposite to each other in the Z-axis direction, and oscillation therefore occurs only in the X-axis direction (only outwardly).

Since balance is achieved to cancel forces which otherwise deflect the left and right parts of arm 10b bounded by center 31 of arm 10b opposite to each other in the Z-axis direction based on the same principle, oscillation occurs only in the X-axis direction (only outwardly). Referring to the oscillatory displacement of arms 10a and 10b in the X-axis direction during the duration of the tuning fork oscillation, as indicated by waveform e in FIG. 5, the phase of the displacement is 90 deg different from the phase of the driving signal represented by waveform c in FIG. 5 because tuning fork type oscillator 1 undergoes resonant oscillation.

Specifically, the oscillatory displacement of arms 10a and 10b in the X-axis direction at maximum amplitudes of the driving signals represented by waveforms c and d in FIG. 5 is zero as indicated by waveform e in FIG. 5. There is no oscillatory displacement of arms 10a and 10b in the Z-axis direction as indicated by waveform f in FIG. 5. As thus described, arms 10a and 10b undergo stable tuning fork oscillation only in the X-Y plane of tuning fork type oscillator 1.

When angular velocity $\Omega$ is applied about the Y-axis when there is stable tuning fork oscillation in the X-Y plane of the tuning fork type oscillator as described above, an electric charge, e.g., a positive charge, is generated at top electrode 15a, and a negative electric charge of the same amplitude is generated at top electrode 16a. Those electric charges are processed by a circuit in the angular velocity sensor according to the invention having the failure diagnosis function shown in FIG. 4, which allows an output signal in accordance with the magnitude of the applied angular velocity $\Omega$ to be led out from terminal 68.

A description will now be made using FIGS. 4 and 5 on operations of the angular velocity sensor of the present embodiment at the time of failure diagnosis.

When the "failure diagnosis mode" shown in FIG. 5 is entered to conduct failure diagnosis, the check signal represented by waveform a in FIG. 5 is input to terminal 54 shown in FIG. 4 from outside. At this time, the control signal for changing the degrees of amplification at amplifiers 45 and 47 (the check signal represented by a in FIG. 5) is input. For example, when the degrees of amplification at amplifiers 45 and 47 are simultaneously decreased by the control signal, the amplitude of the driving signal supplied to top electrode 12a is decreased as indicated by waveform d in FIG. 5. Similarly, the amplitude of the driving signal supplied to top electrode 13a is decreased.

At this time, AGC circuit 43 operates to increase the driving signal supplied to top electrode 11a as indicated by waveform c such that the amplitude of the tuning fork oscillation of arms 10a and 10b in the X-axis direction becomes a predetermined value. Similarly, the amplitude of the driving signal supplied to top electrodes 14a is increased.

Specifically, since the positive (or negative) driving signal supplied to top electrode 11a and the negative (or positive) driving signal supplied to top electrode 12a are inverted or 180 deg different from each other in phase, there is a difference between the amplitude of the driving signal supplied to top electrode 11a and the amplitude of the driving signal supplied to top electrode 12a.

At this time, the force acting to contract piezoelectric film 11b in the Y-axis direction within the boundary constituted by center 30 of arm 10a exceeds the force acting to expand piezoelectric film 12b in the Y-axis direction within the boundary constituted by center 30 of arm 10a. Thus, imbalance occurs between the forces to deflect the left and right parts of arm 10a bounded by center 30 of arm 10a opposite to each other in the Z-axis direction.

As a result, those forces are not canceled, and (outward) oscillation of arm 10a in the X-axis direction occurs, which is simultaneously accompanied by the generation of a force acting to bend the arm from the other side to this side as if there was flexural oscillation in the Z-axis direction attributable to a Coriolis force as a result of application of an angular velocity.

The same thing occurs at arm 10b. Specifically, the force acting to expand piezoelectric film 14b in the Y-axis direction within the boundary constituted by center 31 of arm 10b exceeds the contracting force in the Y-axis direction. Thus, imbalance occurs between the forces to deflect the left and right parts of arm 10b bounded by center 31 of arm 10b opposite to each other in the Z-axis direction.

As a result, those forces are not canceled, and (outward) oscillation of arm 10b in the X-axis direction occurs, which is simultaneously accompanied by the generation of a force acting to bend the arm from the other side to this side as if there was flexural oscillation in the Z-axis direction attributable to a Coriolis force as a result of application of an angular velocity.

Because of the forces to bend arms 10a and 10b in the Z-axis direction, arms 10a and 10b undergo oscillatory displacement in the Z-axis direction as represented by waveform f in FIG. 5. The phase of waveform f representing the oscillatory displacement of arms 10a and 10b in the Z-axis direction agrees with the phase of the waveform of the driving signal represented by waveform c in FIG. 5. The reason is as follows. Tuning fork type oscillator 1 is designed to have different resonance frequencies in the X-axis direction and the Z-axis direction by controlling the width and thickness of arms 10a and 10b appropriately. Therefore, when arms 10a and 10b are driven at the resonance frequency in the X-axis direction, no resonation occurs because oscillation of arms 10a and 10b in the Z-axis direction does not undergo resonance at the resonance frequency in the X-axis direction.

As a result, when the driving signal represented by waveform c in FIG. 5 is at the maximum amplitude (indicated by reference sign cp), oscillatory displacement f of arms 10a and 10b is also at the maximum (indicated by reference sign fp). Further, the phase of the oscillatory displacement of arms 10a and 10b in the Z-axis direction represented by waveform f in FIG. 5 agrees with the phase of the waveform of oscillatory displacement of arms 10a and 10b in the Z-axis direction which occurs when angular velocity $\Omega$ is applied about the Y-axis.

Electric charges generated at top electrodes 15a and 16a in accordance with the oscillatory displacement of arms 10a and 10b are input to current amplifiers 62 and 63, and output from each of current amplifiers 62 and 63 is input to differential amplifier 64 to amplify a differential signal between them at the differential amplifier. When output from differential amplifier 64 is input to phase device 65, phase device 65 provides output as represented by waveform g in FIG. 5.

The output represented by g in FIG. 5 is the same as an output waveform which is generated as if angular velocity $\Omega$ was actually applied about the Y-axis. When the output (waveform g in FIG. 5) is subjected to synchronous wave detection at synchronous wave detector 66 using an output signal from current amplifier 41, a signal is obtained as represented by waveform h in FIG. 5. When the signal is processed by low-pass filter 67, the output has magnitude V68 as represented by waveform i in FIG. 5. Output V68 is led through terminal 68 to the outside as a signal which allows failure diagnosis.

Let us now define that DM represents the amplitude of the driving signal (waveform c in FIG. 5) supplied to top electrode 12a when the check signal is input to terminal 54 from outside and that DP represents the amplitude of the driving signal (waveform d in FIG. 5) supplied to top electrode 11a. Then, a certain relationship (V68=k(DP−DM) where k represents a function) exists between (DP−DM) and magnitude V68 of the signal led through terminal 68 (see FIG. 6).

In FIG. 6, the abscissa axis represents (DP−DM), and the ordinate axis represents output V68. As shown in FIG. 6, V68 is linear until DP−DM equals $\alpha$. When DP−DM equals $\alpha$, output V68 equals $\Delta V$ whose magnitude and waveform is represented by waveform i in FIG. 5.

As described above, an angular velocity detection circuit for detecting angular velocity $\Omega$ which has been actually applied can be used to output a signal allowing failure diagnosis on the detecting portions according to the check signal represented by waveform a in FIG. 5 input to terminal 54 from outside. That is, the angular velocity detection circuit also serves as a self diagnosis circuit in this example.

The failure diagnosis on the detecting portions can be accurately carried out despite of the simple and compact configuration without providing additional means on the oscillator for failure diagnosis on the detecting portions separately from the driving portions and detecting portions. Since the driving portions and the detecting portions are provided on the oscillator independently from each other, it is possible to output a signal enabling independent failure diagnosis of the detecting portions which are made independent from driving portions.

The description has addressed an example in which driving portions are provided on both arms. Alternatively, a driving portion may be provided on at least one principal surface of at least one arm. Similarly, a detecting portion may alternatively be provided on at least one principal surface of at least one arm.

The description has addressed an example in which driving portions are provided independently of each other on both sides of a boundary constituted by the center of one arm. Alternatively, at least upper electrodes may be provided apart from each other across a boundary constituted by the center of an arm.

Since the configuration allows the check signal (waveform a in FIG. 5) to be input to terminal 54 from outside, failure diagnosis can be carried out from outside at any time.

The above description has addressed a configuration in which an angular velocity detection circuit also serves as a self diagnosis circuit. Alternatively, the angular velocity detection circuit and the self diagnosis circuit may be provided independently of each other.

While a signal enabling failure diagnosis obtained as an output (waveform i in FIG. 5) from terminal 68, a configuration may alternatively be employed in which a circuit for determining output i is incorporated in an angular velocity sensor provided downstream of terminal 68.

Embodiment 2

Figure 7:
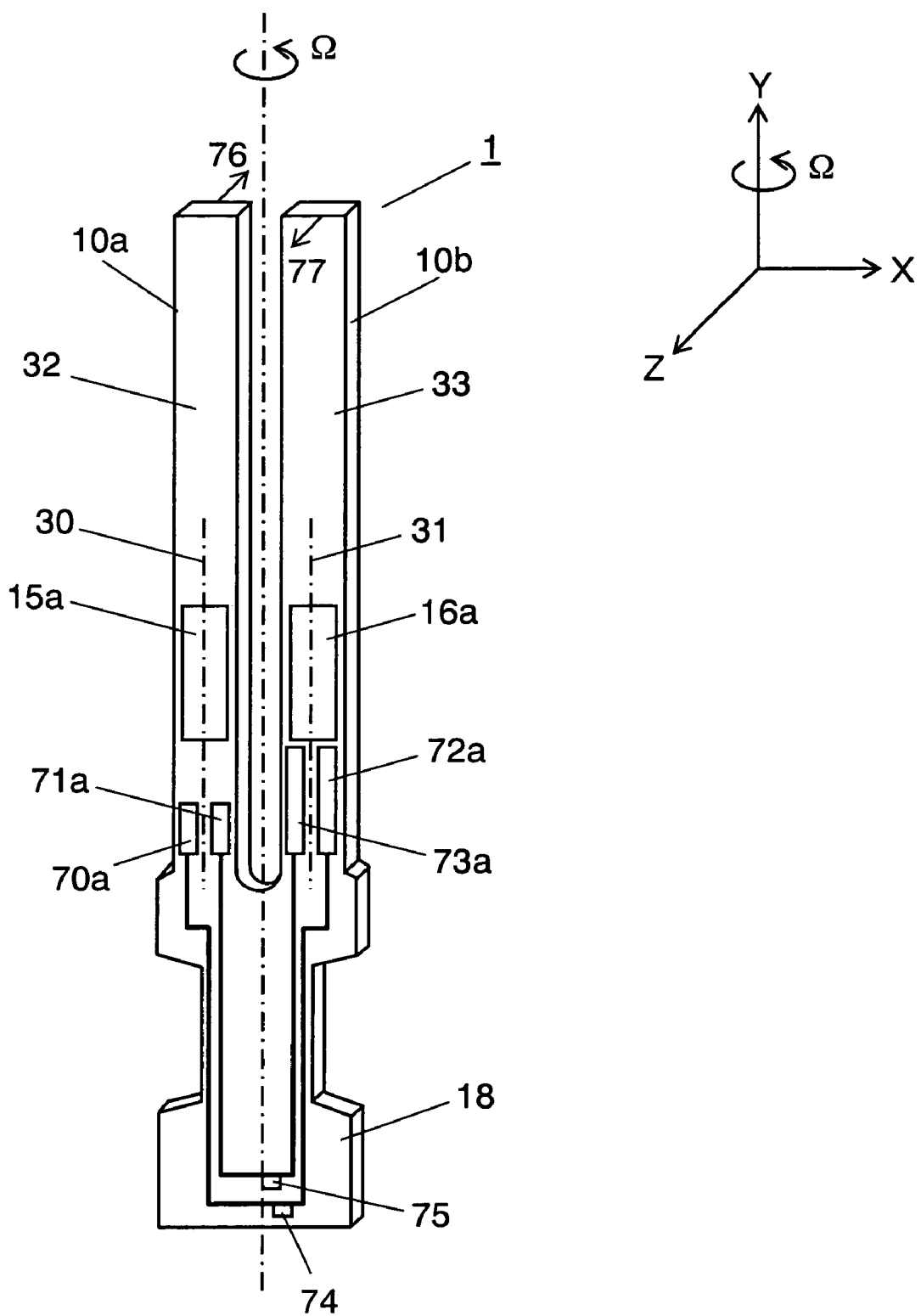
FIG. 7 is a perspective view of a tuning fork type oscillator used in an angular velocity sensor according to Embodiment 2 of the invention.

FIG. 7 is a perspective view of a tuning fork type oscillator used in an angular velocity sensor according to Embodiment 2 of the invention. Tuning fork type oscillator 1 includes arms 10a and 10b just as in Embodiment 1 (FIG. 2). Tuning fork type oscillator 1 is supported by support portion 18. Top electrodes 15a and 16a are provided on arms 10a and 10b, respectively. Centers 30 and 31 are shown on arms 10a and 10b to represent the centers of the respective arms.

Referring to FIG. 7, top electrodes 70a, 71a, 72a, and 73a are provided as driving electrodes. Top electrodes 70a and 71a are provided on arm 10a, and top electrodes 72a and 73a are provided on arm 10b. Pad electrode 74 is connected to top electrodes 70a and 72a, and pad electrode 75 is connected to top electrodes 71a and 73a.

Referring to FIG. 7, a bottom electrode (not shown), a piezoelectric film obtained by polarizing a film made of PZT in the vertical direction (not shown), and top electrode 70a are provided on the left side of a boundary constituted by center 30 of principal surface 32 of arm 10a. A bottom electrode (not shown), a piezoelectric film obtained by polarizing a film made of PZT in the vertical direction (not shown), and top electrode 71a are substantially symmetrically provided on the right side of the boundary constituted by center 30.

A bottom electrode (not shown), a piezoelectric film obtained by polarizing a film made of PZT in the vertical direction (not shown), and top electrode 73a are provided on the left side of a boundary constituted by center 31 of principal surface 33 of arm 10b. A bottom electrode (not shown), a piezoelectric film obtained by polarizing a film made of PZT in the vertical direction (not shown), and top electrode 72a are substantially symmetrically provided on the right side of the boundary constituted by center 31. The embodiment is different from Embodiment 1 in that left and right arms 10a and 10b are not symmetric about the axis of symmetry of tuning fork type oscillator 1 and in that driving portions on arm 10b are formed with a greater surface area than that of driving portions on arm 10a.

Pad electrodes 74 and 75 are connected to terminals 51 and 50 shown in FIG. 4, respectively. However, the embodiment is different from Embodiment 1 in that there is no need for providing terminals 52 and 53 shown in FIG. 4. Since amplifiers 46 and 47 are therefore also unnecessary, the circuit configuration is simplified.

A description will now be made on operations of the angular velocity sensor of Embodiment 2 during normal angular velocity detection.

In a normal mode of angular velocity detection, the check signal for carrying out failure diagnosis (waveform a in FIG. 5) is not input to terminal 54 (see FIG. 4) from outside just as in Embodiment 1. That is, the control signal for changing the degree of amplification at amplifier 45 is not input. Therefore, driving signals supplied to top electrodes 70a, 71a, 72a, and 73a are all equal in amplitude.

A positive (or negative) driving signal supplied to top electrode 70a and a negative (or positive) driving signal supplied to top electrode 71a are set inversely or 180 deg different from each other in phase. Further, a positive (or negative) driving signal supplied to top electrode 72a and a negative (or positive) driving signal supplied to top electrode 73a are also set inverted or 180 deg different from each other in phase.

At this time, since balance is achieved to cancel forces acting to deflect left and right parts of arm 10a bounded by center 30 of arm 10a opposite to each other in the Z-axis direction, oscillation occurs only in the X-axis direction of tuning fork type oscillator 1 (only outwardly). Since balance is achieved to cancel forces acting to deflect the left and right parts of arm 10b bounded by center 31 of arm 10b opposite to each other in the Z-axis direction based on the same principle, oscillation occurs only in the X-axis direction (only outwardly).

As a result, arms 10a and 10b of Embodiment 2 can undergo stable tuning fork oscillation in the X-Y plane of tuning fork type oscillator 1 just as in Embodiment 1. Thus, an output signal in accordance with the magnitude of angular velocity Q applied about the Y-axis of the tuning fork type oscillator can be led out from terminal 68 just as in Embodiment 1.

A description will now be made on operations of the angular velocity sensor of Embodiment 2 at the time of failure diagnosis.

Just as in Embodiment 1, the check signal represented by waveform a in FIG. 5 to enable failure diagnosis is input to terminal 54 serving as a failure diagnosis check terminal from the outside, which is not shown. At this time, the control signal for changing the degree of amplification at amplifier 45 (the check signal represented by a in FIG. 5) is input. For example, when the degree of amplification at amplifier 45 is decreased by the control signal, the amplitude of the driving signals supplied to top electrodes 71a and 73a is decreased. At this time, AGC circuit 43 operates to increase the amplitude of the driving signals supplied to top electrodes 70a and 72a such that the amplitude of tuning fork oscillation of arms 10a and 10b in the X-axis direction becomes a predetermined value.

When the positive (or negative) driving signal supplied to top electrode 70a and the negative (or positive) driving signal supplied to top electrode 71a are inverted from each other or when driving signals at a phase difference of 180 deg from each other are supplied, there is a difference in amplitude between the driving signals because the amplitude of the driving signal supplied to top electrode 70a is greater than that of the driving signal supplied to top electrode 71a.

At this time, the force acting to contract the piezoelectric film on the left side of the boundary constituted by center 30 of arm 10a in the Y-direction exceeds the force acting to expand the piezoelectric film on the right side in the Y-axis direction. Thus, imbalance occurs between the forces acting to deflect the left and right parts of arm 10a bounded by center 30 of arm 10a opposite to each other in the Z-axis direction. As a result, those forces are not canceled, and (outward) oscillation of arm 10a in the X-axis direction occurs, which is simultaneously accompanied by the generation of a force acting to bend the arm from the other side to this side as if there was flexural oscillation in the Z-axis direction attributable to a Coriolis force as a result of application of an angular velocity.

The same thing occurs at arm 10b. Specifically, the force acting to contract the piezoelectric film on the right side of the boundary constituted by center 31 of arm 10b in the Y-direction exceeds the force acting to expand the piezoelectric film on the left side in the Y-axis direction. Thus, imbalance occurs between the forces acting to deflect the left and right parts of arm 10b bounded by center 31 of arm 10b opposite to each other in the Z-axis direction.

As a result, those forces are not canceled, and (outward) oscillation of arm 10b in the X-axis direction occurs, which is simultaneously accompanied by the generation of a force which acts to bend the arm from the other side to this side as if there was flexural oscillation in the Z-axis direction attributable to a Coriolis force as a result of application of an angular velocity.

However, the embodiment is different from Embodiment 1 in that the magnitude of the bending force acting on arm 10b exceeds the magnitude of the bending force acting on arm 10a because the surface area of the driving portions on arm 10b is greater than that of the driving portions on arm 10a (or a differential force is generated).

Thus, based on the differential force, arm 10a rotates in the direction indicated by reference numeral 76 (the arrow extending from this side to the other side) based on the differential force, and arm 10b rotates in the direction indicated by reference numeral 77 (the arrow extending from the other side to this side).

As will be apparent from the above description, in Embodiment 2, electric charges generated at top electrodes 15a and 16a as a result of oscillatory displacement of arms 10a and 10b can be led out from terminal 68 as a signal enabling failure diagnosis on the detecting portions using the angular velocity circuit for detecting angular velocity Ω which has been actually applied, just as in Embodiment 1.

The failure diagnosis on the detecting portions can be accurately carried out despite of the simple and compact configuration without providing additional means on the oscillator for failure diagnosis on the detecting portions separately from the driving portions and detecting portions. Since the driving portions and the detecting portions are provided on the oscillator independently from each other, it is possible to output a signal enabling independent failure diagnosis of the detecting portions which are made independent from driving portions.

The description has addressed an example in which detecting portions are provided on both arms. Alternatively, a detecting portion may be provided on at least one principal surface of at least one arm.

The description has addressed an example in which driving portions are provided independently of each other on both sides of a boundary constituted by the center of one arm. Alternatively, at least upper electrodes may be provided apart from each other across a boundary constituted by the center of an arm.

The configuration allows the check signal represented by waveform a in FIG. 5 to be input to terminal 54 from the outside, which is not shown. Therefore, failure diagnosis can be carried out at any time by receiving the failure diagnosis check signal from outside as occasion arises.

The above description has addressed a configuration in which an angular velocity detection circuit also serves as a self diagnosis circuit. Alternatively, the angular velocity detection circuit and the self diagnosis circuit may obviously be provided independently of each other.

While a signal enabling failure diagnosis obtained as the output represented by waveform i in FIG. 5 from terminal 68, a configuration may alternatively be employed in which a circuit for determining output represented by waveform i in FIG. 5 is incorporated in an angular velocity sensor provided downstream of terminal 68.

Embodiment 3

FIG. 7 is a perspective view of a tuning fork type oscillator used in an angular velocity sensor according to Embodiment 3 of the invention. Tuning fork type oscillator 1 includes arms 10a and 10b just as in Embodiment 1 (FIG. 2) and Embodiment 2 (FIG. 7). Tuning fork type oscillator 1 is supported by support portion 18. Top electrodes 15a and 16a are provided on arms 10a and 10b, respectively. Centers 30 and 31 are shown on arms 10a and 10b to represent central positions of the respective arms.

Figure 8:
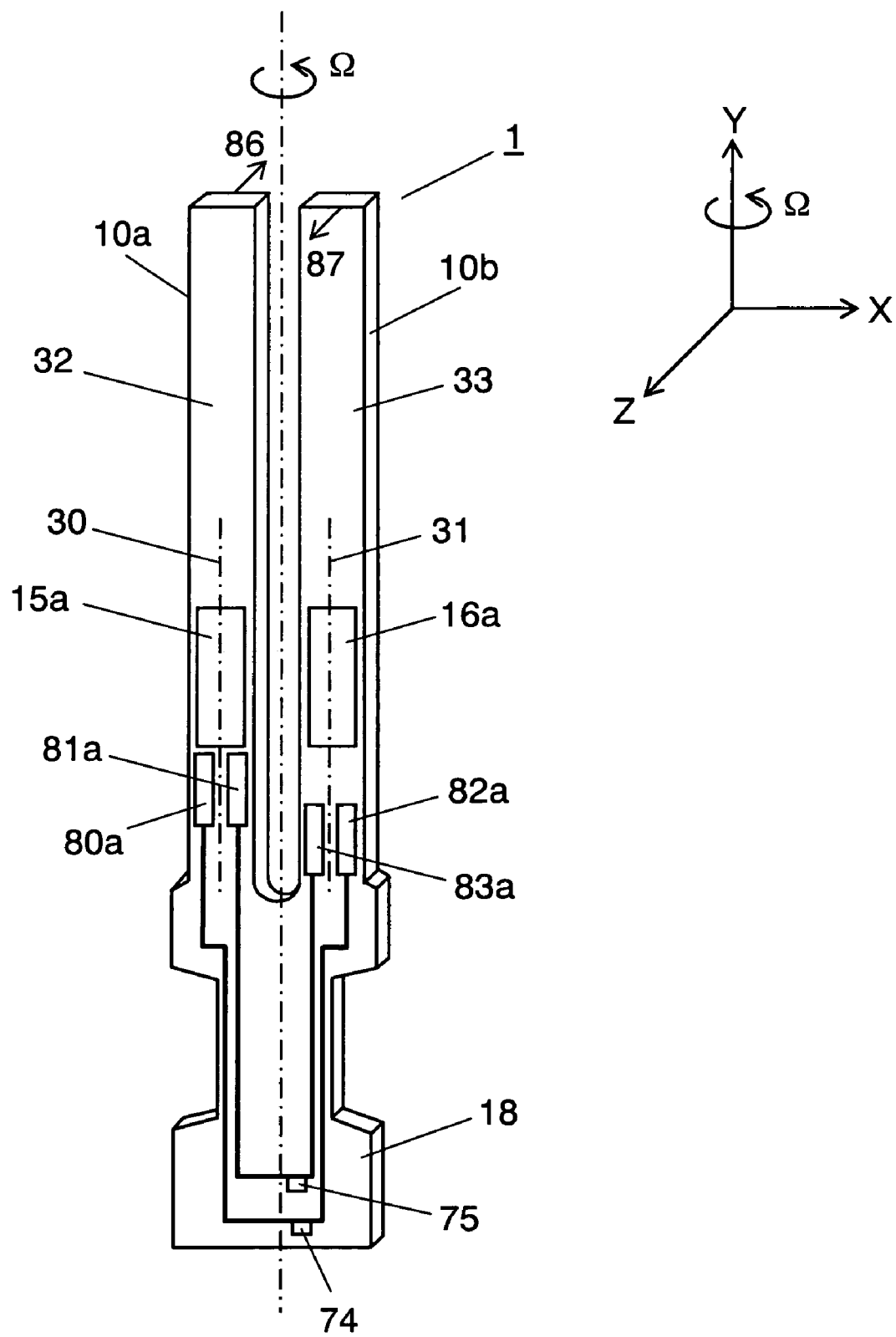
FIG. 8 is a perspective view of a tuning fork type oscillator used in an angular velocity sensor according to Embodiment 3 of the invention.
Figure 9:
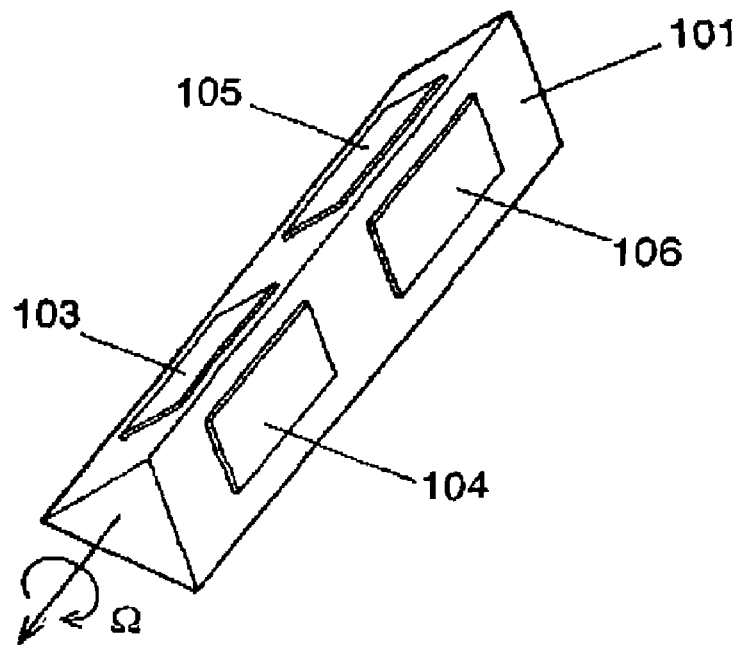
FIG. 9 is a perspective view of an oscillator of a conventional tuning fork type oscillator.
Figure 10:
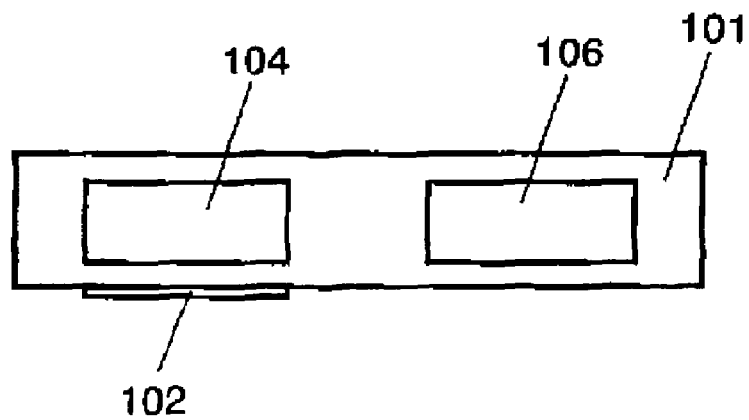
FIG. 10 is a perspective view of an oscillator of a conventional tuning fork type oscillator.

Referring to FIG. 8, top electrodes 80a, 81a, 82a, and 83a are provided as driving electrodes. Top electrodes 80a and 81a are provided on arm 10a, and top electrodes 82a and 83a are provided on arm 10b. Pad electrode 74 is connected to top electrodes 80a and 82a, and pad electrode 75 is connected to top electrodes 81a and 83a.

Top electrodes 80a, 81a, 82a, and 83a are provided as driving electrodes. Top electrodes 80a and 82a are commonly connected through pad electrode 74, and top electrodes 81a and 83a are commonly connected through pad electrode 75.

Referring to FIG. 8, a bottom electrode (not shown), a piezoelectric film obtained by polarizing a film made of PZT in the vertical direction (not shown), and top electrode 80a are provided on the left side of a boundary constituted by center 30 of principal surface 32 of arm 10a. A bottom electrode (not shown), a piezoelectric film obtained by polarizing a film made of PZT in the vertical direction (not shown), and top electrode 81a are substantially symmetrically provided on the right side of the boundary constituted by center 30.

A bottom electrode (not shown), a piezoelectric film obtained by polarizing a film made of PZT in the vertical direction (not shown), and top electrode 83a are provided on the left side of a boundary constituted by center 31 of principal surface 33 of arm 10b. A bottom electrode (not shown), a piezoelectric film obtained by polarizing a film made of PZT in the vertical direction (not shown), and top electrode 82a are substantially symmetrically provided on the right side of the boundary constituted by center 31.

Embodiment 3 is different in configuration from Embodiments 1 and 2 in that left and right arms 10a and 10b are not symmetric about the axis of symmetry of tuning fork type oscillator 1 with respect to driving portions (top electrodes 80, 81a, 82a, and 83a). Specifically, the driving portions on arm 10a are disposed in positions closer to the ends of tuning fork type oscillator 1 than the positions of the driving portions (top electrodes 82a and 83a) on arm 10b. That is, top electrodes 80a and 81a are disposed higher than top electrodes 82a and 83a with FIG. 8 viewed from this side.

The driving portions disposed on arm 10a closer to the end of arm 10a are substantially equal in surface area to the driving portions on arm 10b. Pad electrodes 74 and 75 are connected to terminals 51 and 50 shown in FIG. 4, respectively. The embodiment is different in configuration from Embodiment 1 in that amplifiers 46 and 47 are not required because there is no need for using terminals 52 and 53 shown in FIG. 4, it is therefore possible to provide a compact angular velocity sensor with a simpler circuit configuration.

A description will now be made on operations of the angular velocity sensor of Embodiment 3 during normal angular velocity detection.

In a normal mode of angular velocity detection, the check signal for carrying out failure diagnosis (waveform a in FIG. 5) is not input to terminal 54 serving as a failure diagnosis check terminal from the outside, which is not shown, just as in Embodiments 1 and 2. Thus, the control signal for changing the degree of amplification at amplifier 45 is not input. Therefore, driving signals supplied to top electrodes 80a, 81a, 82a, and 83a are all equal in amplitude.

A driving signal, e.g., a positive (or negative) signal, supplied to top electrode 80a and a driving signal, e.g. a negative (or positive) signal, supplied to top electrode 81a are set inverted or 180 deg different from each other in phase. Further, a driving signal, e.g., a positive (or negative) signal, to top electrode 82a and a driving signal, e.g. a negative (or positive) signal, supplied to top electrode 83a are set inverted or 180 deg different from each other in phase.

When such conditions are set, balance is achieved to cancel forces acting to deflect left and right parts of arm 10a bounded by center 30 of arm 10a opposite to each other in the Z-axis direction. Thus, oscillation occurs only in the X-axis direction (only outwardly). Balance is achieved to cancel forces acting to deflect the left and right parts of arm 10b bounded by center 31 of arm 10b opposite to each other in the Z-axis direction based on the same principle. Thus, oscillation occurs only in the X-axis direction (only outwardly). As a result, arms 10a and 10b can undergo stable tuning fork oscillation only in the X-Y plane of the tuning fork type oscillator just as in Embodiment 1 or Embodiment 2. Thus, an output signal in accordance with the magnitude of angular velocity $\Omega$ applied about the Y-axis of the tuning fork type oscillator can be led out from terminal 68 just as in Embodiment 1 and Embodiment 2.

A description will now be made on operations of the angular velocity sensor of Embodiment 3 at the time of failure diagnosis.

Just as in Embodiment 1, for example, the check signal represented by waveform a in FIG. 5 to enable failure diagnosis is input to terminal 54 from the outside, which is not shown. That is, the control signal for changing the degree of amplification at amplifier 45 (waveform a in FIG. 5) is input. For example, when the degree of amplification at amplifier 45 is decreased by the control signal, the amplitude of the driving signals supplied to top electrodes 81a and 83a serving as driving electrodes is decreased.

At this time, AGC circuit 43 operates to increase the amplitude of the driving signals supplied to top electrodes 80a and 82a such that the amplitude of tuning fork oscillation of arms 10a and 10b in the X-axis direction becomes a predetermined value.

The phases of the positive (or negative) driving signal supplied to top electrode 80a and the negative (or positive) driving signal supplied to top electrode 81a are set in an inverted relationship with each other. There is a difference in amplitude between the driving signals because the amplitude of the driving signal supplied to top electrode 80a is greater than that of the driving signal supplied to top electrode 81a.

Therefore, the force acting to contract the piezoelectric film on the left side of the boundary constituted by center 30 of arm 10a in the Y-direction exceeds the force acting to expand the piezoelectric film on the right side in the Y-axis direction. Thus, imbalance occurs between the forces acting to deflect the left and right parts of arm 10a bounded by center 30 of arm 10a opposite to each other in the Z-axis direction. As a result, those forces are not canceled, and (outward) oscillation of arm 10a in the X-axis direction occurs, which is simultaneously accompanied by the generation of a force which acts to bend the arm from the other side to this side as if there was flexural oscillation in the Z-axis direction attributable to a Coriolis force as a result of application of an angular velocity.

The same thing occurs at arm 10b. Specifically, the force acting to contract the piezoelectric film on the right side of the boundary constituted by center 31 of arm 10b in the Y-direction exceeds the force acting to expand the piezoelectric film on the left side in the Y-axis direction. Thus, imbalance occurs between the forces acting to deflect the left and right parts of arm 10b bounded by center 31 of arm 10b opposite to each other in the Z-axis direction. As a result, those forces are not canceled, and (outward) oscillation of arm 10b in the X-axis direction occurs, which is simultaneously accompanied by the generation of a force which acts to bend the arm from the other side to this side as if there was flexural oscillation in the Z-axis direction attributable to a Coriolis force as a result of application of an angular velocity.

Embodiment 3 is different from Embodiments 1 and 2 in that forces acting to bend both of arms 10a and 10b from the other side to this side are generated. However, since the driving portions on arm 10a (top electrodes 80a and 81a) are disposed in positions closer to the ends of tuning fork type oscillator 1 than the positions of the driving portions on arm 10b (top electrodes 82a and 83a) in the Y-axis direction, arm 10b tends to be bent greater than arm 10a. In other words, a differential force is generated.

Because of the differential force, arm 10a consequently rotates in the direction indicated by reference numeral 86 (the arrow extending from the other side to this side), and arm 10b rotates in the direction indicated by reference numeral 87 (the arrow extending from the other side to this side).

In Embodiment 3 again, electric charges generated at top electrodes 15a and 16a as a result of oscillatory displacement of arms 10a and 10b can be led out from terminal 68 as a signal enabling failure diagnosis on the detecting portions using the angular velocity detection circuit for detecting angular velocity $\Omega$ which has been actually applied, for example, just as in Embodiment 1.

In Embodiment 3, the failure diagnosis on the detecting portions can be accurately carried out despite of the simple and compact configuration without providing additional means on the oscillator for failure diagnosis on the detecting portions separately from the driving portions and detecting portions. Since the driving portions and the detecting portions are provided on the oscillator independently from each other, it is possible to output a signal enabling independent failure diagnosis of the detecting portions which are made independent from driving portions.

Although the description has addressed an example in which detecting portions are provided on both arms, what is required is to provide a driving portion on at least one principal surface of at least one arm.

The description has addressed an example in which driving portions are provided independently of each other on both sides of a boundary constituted by the center of one arm. However, what is required is to space at least upper electrodes across a boundary constituted by the center of an arm.

Since Embodiment 3 has the configuration in which the check signal can be input to terminal 54 serving as a failure diagnosis check terminal from outside, failure diagnosis can be carried out arbitrarily by receiving a failure diagnosis check signal from outside as occasion arises.

The above description has addressed a configuration in which an angular velocity detection circuit also serves as a self diagnosis circuit. Alternatively, the angular velocity detection circuit and the self diagnosis circuit may be provided independently of each other.

In Embodiment 3, an output which enables failure diagnosis and which has been processed by low-pass filter 67 represented by waveform i in FIG. 5 can be led out from terminal 68. Although not shown, a configuration may alternatively be employed in which a circuit for determining output represented by waveform i is incorporated in an angular velocity sensor provided downstream of terminal 68.

Although Embodiments 1, 2, and 3 have addressed examples in which a base portion of a tuning fork type oscillator is made of silicon that is a non-piezoelectric material, this is not limiting. For example, diamond, fused quartz, alumina, GaAs, or the like may be used. A piezoelectric material such as quartz, LiTaO$_3$, or LiNbO$_3$ may alternatively be used.

Although a tuning fork type oscillator has been described as an oscillator in Embodiments 1, 2, and 3, this is not limiting. Oscillators in various shapes, e.g., a bar-shaped oscillator, may alternatively be used.

INDUSTRIAL APPLICABILITY

An angular velocity sensor according to the invention has high industrial applicability because it can be advantageously used as an angular velocity sensor in which failure diagnosis can be accurately carried out on detecting portions despite of its simple configuration and small size without providing additional means for failure diagnosis of detecting portions on an oscillator separately from driving portions and detecting portions.

The invention claimed is:

1. An angular velocity sensor comprising:
an oscillator;
a driving portion provided on the oscillator for driving the oscillator in an X-axis direction and a Z-axis direction;
a first driving circuit for supplying a driving signal for driving the oscillator in the X-axis direction to the driving portion;
a second driving circuit for supplying a driving signal for driving the oscillator in the X-axis direction and the Z-axis direction to the driving portion;
a detecting portion provided on the oscillator for detecting deflection of the oscillator during oscillation in the Z-axis direction;
an angular velocity detection circuit for outputting an angular velocity signal by amplifying and detecting a signal output from the detecting portion when the driving signal is supplied from the first driving circuit to the driving portion and an angular velocity is input about a Y-axis; and
a self diagnosis circuit for outputting a signal enabling failure diagnosis on the detecting portion by amplifying and detecting a signal output from the detecting portion when the driving signal is supplied from the second driving circuit to the driving portion,
wherein:
the oscillator is a tuning fork type oscillator made of an elastic material and having at least two arms and at least one base portion connecting the arms;
the driving portion includes a piezoelectric film on which at least upper electrodes are spaced from each other across the center of at least one principal surface of at least one of the arms of the tuning fork type oscillator;
the detecting portion includes a piezoelectric film provided on at least one principal surface of at least one of the arms of the tuning fork type oscillator and having an electrode on both sides thereof;
driving signals which are inverted from each other in phase are supplied from the first driving circuit to the upper electrodes spaced from each other to cause tuning fork oscillation in the X-axis direction; and
driving signals which are inverted from each other in phase and different in amplitude are supplied from the second driving circuit to the upper electrodes spaced from each other to cause tuning fork oscillation in the X-axis direction and oscillation also in the Z-axis direction.

2. The angular velocity sensor of claim 1, wherein:
the oscillator is a tuning fork type oscillator made of an elastic material and having at least two arms and at least one base portion connecting the arms;
the driving portion includes a pair of piezoelectric films spaced from each other across the center of at least one principal surface of at least one of the arms of the tuning fork type oscillator, the films having an upper electrode on the top and a lower electrode on the bottom thereof;
the detecting potion includes a piezoelectric film provided on at least one principal surface of at least one of the arms of the tuning fork type oscillator and having an electrode on both sides thereof;
driving signals which are inverted from each other in phase are supplied from the first driving circuit to the upper electrodes spaced from each other to cause tuning fork oscillation in the X-axis direction; and
driving signals which are inverted from each other in phase and different in amplitude are supplied from the second driving circuit to the upper electrodes spaced from each other to cause tuning fork oscillation in the X-axis direction and oscillation also in the Z-axis direction.

3. The angular velocity sensor of claim 1, wherein:
the oscillator is a tuning fork type oscillator made of an elastic material and having at least two arms and at least one base portion connecting the arms;
the driving portion includes first and second piezoelectric films which are provided on the two arms of the tuning fork type oscillator and on which at least upper electrodes are spaced from each other across the center of one principal surface of each arm, a difference being provided at least between the surface areas of the upper electrodes on the respective arms;
the detecting portion includes a piezoelectric film provided on at least one principal surface of at least one of the arms of the tuning fork type oscillator and having an electrode on both sides thereof;
driving signals which are inverted from each other in phase are supplied from the first driving circuit to the upper electrodes provided on the first and second piezoelectric films, respectively, and spaced from each other to cause tuning fork oscillation in the X-axis direction; and
driving signals which are inverted from each other in phase and different in amplitude are supplied from the second driving circuit to the upper electrodes provided on the first and second piezoelectric films, respectively, and spaced from each other to cause tuning fork oscillation in the X-axis direction and oscillation also in the Z-axis direction.

4. The angular velocity sensor of claim 1, wherein:
the oscillator is a tuning fork type oscillator made of an elastic material and having at least two arms and at least one base portion connecting the arms;
the driving portion includes a pair of piezoelectric films which are provided on each of the two arms of the tuning fork type oscillator and spaced from each other across the center of one principal surface of each arm and which have an electrode on each of the top and bottom thereof, a difference being provided at least between the surface areas of the top electrodes on the respective arms;
the detecting portion includes a piezoelectric film provided on at least one principal surface of at least one of the arms of the tuning fork type oscillator and having an electrode on both sides thereof;

driving signals which are inverted from each other in phase are supplied from the first driving circuit to the top electrodes provided on the respective pairs of piezoelectric films and spaced from each other to cause tuning fork oscillation in the X-axis direction; and driving signals which are inverted from each other in phase and different in amplitude are supplied from the second driving circuit to the top electrodes provided on the respective pairs of piezoelectric films and spaced from each other to cause tuning fork oscillation in the X-axis direction and oscillation also in the Z-axis direction.

5. The angular velocity sensor of claim 1, wherein:

the oscillator is a tuning fork type oscillator made of an elastic material and having at least two arms and at least one base portion connecting the arms;

the driving portion includes first and second piezoelectric films which are provided on each of the two arms of the tuning fork type oscillator and on which at least upper electrodes are spaced from each other across the center of one principal surface of each and, a difference being provided at least between the positions in the Y-axis direction of the upper electrodes on the respective arms;

the detecting portion includes a piezoelectric film provided on at least one principal surface of at least one of the arms of the tuning fork type oscillator and having an electrode on both sides thereof;

driving signals which are inverted from each other in phase are supplied from the first driving circuit to the upper electrodes provided on the first and second piezoelectric films, respectively, and spaced from each other to cause tuning fork oscillation in the X-axis direction; and driving signals which are inverted from each other in phase and different in amplitude are supplied from the second driving circuit to the upper electrodes provided on the first and second piezoelectric films, respectively, and spaced from each other to cause tuning fork oscillation in the X-axis direction and oscillation also in the Z-axis direction.

6. The angular velocity sensor of claim 1, wherein:

the oscillator is a tuning fork type oscillator made of an elastic material and having at least two arms and at least one base portion connecting the arms;

the driving portion includes a pair of piezoelectric films which are provided on each of the two arms of the tuning fork type oscillator and spaced from each other across the center of one principal surface of each arm and which have an electrode on each of the top and bottom thereof a difference being provided at least between the positions of the top electrodes on the respective arms in the Y-axis direction;

the detecting portion includes a piezoelectric film provided on at least one principal surface of at least one of the arms of the tuning fork type oscillator and having an electrode on both sides thereof;

driving signals which are inverted from each other in phase are supplied from the first driving circuit to the top electrodes provided on the respective pairs of piezoelectric films and spaced from each other to cause tuning fork oscillation in the x-axis direction; and driving signals which are inverted from each other in phase and different in amplitude are supplied from the second driving circuit to the top electrodes provided on the respective pairs of piezoelectric films and spaced from each other to cause tuning fork oscillation in the X-axis direction and oscillation also in the Z-axis direction.

7. The angular velocity sensor of claim 1, which also has the functions of the angular velocity detection circuit and the self diagnosis circuit.

8. The angular velocity sensor of any of claims 2 to 6, comprising a check terminal to which a check signal is input from outside of the angular velocity sensor to carry out the failure diagnosis, wherein means for generating a difference in amplitude between the driving signals according to an output signal from the check terminal is provided in the second driving circuit.

* * * * *